United States Patent Office 3,372,992
Patented Mar. 12, 1968

3,372,992
METHOD FOR DETERMINING BLOOD SERUM IRON-BINDING CAPACITY
Robert H. Storey, Waukegan, Howard J. Glenn, Lake Bluff, and William J. O'Malley, Gurnee, Ill., assignors to Abbott Laboratories, Chicago, Ill., a corporation of Illinois
No Drawing. Filed Sept. 30, 1964, Ser. No. 400,588
5 Claims. (Cl. 23—230)

This invention relates to a method for measuring the unsaturated iron binding capacity of serum. In particular, the method involves the use of a radioactive iron compound.

Circulating ferric iron is known to be bound to the $B_1$-globulin fraction of serum proteins. Serum has a definite total iron-binding capacity (TIBC) and is partially saturated by the iron present, normally one-third saturated. This quantity of iron is known as serum iron (SI). The remainder is the unsaturated iron-binding capacity (UIBC), so that we have the general relation:

$$TIBC = UIBC + SI$$

The determination of UIBC is an excellent aid to the diagnosis of iron deficiency and regular, frequent determinations can be very valuable in controlling treatment.

The clinical usefulness of determinations of iron-binding capacity has been reported in patients with hemolytic anemias, myelophthisic and pernicious anemia, nutritional deficiency, acute hepatitis, radiation exposure, Hodgkins disease, as well as in pregnancy.

There are several tests known for the measurement of iron-binding capacity involving a variety of techniques—both in vitro and in vivo. Most of these tests are cumbersome and tedious. Direct photometric methods make use of the fact that the protein-iron complex is pink and may be directly estimated photometrically. These methods give an estimate of UIBC by measuring the increase in pink color which results from the addition of iron salts to the serum. Serum is quantitatively diluted with saline and the change in optical density which follows the addition of an iron salt is observed. The UIBC is then calculated from the quantity of iron added. Because the change in optical density is small, these methods are not entirely satisfactory. They are affected by turbidity and hemolysis and can produce erratic results. Physiological methods involving the intravenous injection of iron have long been known. Even though the amount of iron injected is small, a high incidence of minor toxic reactions have been reported with the use of such methods. There is, therefore, a real disadvantage in employing merely as part of any analytical technique the intravenous injection of a quantity of iron which is liable to cause even mildly toxic reactions.

The advent of radioactive isotopes provides the art with a basically new approach to the measurement of the iron-binding capacity of serum. The method of the present invention provides an in vitro test which does not require the presence and cooperation of the patient for the determination of iron-binding capacity. Being an in vitro test, it avoids the administration of radioactivity to the patient. The method permits the evaluation of unsaturated iron-binding capacity under circumstances where other methods may not be applicable. For example, it may be used following the administration of ferrous iron which can interfere when chemical test methods are used. The presence of red blood cells or hemoglobin also does not interefere with the method.

Briefly stated, the method of the present invention utilizes an anion exchange resin incorporated in a sponge of polyurethane foam of intercommunicating cell type. The resin in the sponge acts as a secondary binding site for radioactive iron which is added to the serum. When the radioactive iron is added to the serum, the protein rapidly reacts with the iron. The amount of iron which reacts with the protein represents the unsaturated iron-binding capacity of the serum. When the sponge is added to the serum and radioactive iron solution, the excess iron which has not reacted with the protein, reacts with the resin in the sponge. The total radioactivity added to the serum is counted in a suitable well scintillation counter. After a suitable incubation period, the serum-radioactive iron solution is discarded and the sponge is washed with iron-free water, aqueous solution, or other suitable washing preparation. The radioactivity remaining on the sponge is then determined. This quantity represents the excess iron and can be expressed as a percentage of the total radioactivity added to the serum, i.e., percent sponge uptake. The unsaturated iron-binding capacity can then be determined by subtracting from the total weight of iron added to the serum the excess iron as represented by the percent sponge uptake.

The tracer amount of radioactive iron, $Fe^{59}$, can be prepared from suitable sources by proper dilution. While any ferric iron will bind to blood serum, ferric ammonium citrate has been found to be particularly suitable since it can be buffered to a final pH of about 7.0. The iron-serum protein complex partially dissociates when the pH is below 7, and dissociates more vigorously when the pH is below 6. Ferric chloride, for example, requires a low pH in order to maintain the ferric ion in solution and is therefore not as desirable. The amount of activity should be a workable amount for tracer purposes. This will depend on, among other factors, the amount of blood serum used and the sensitivity of the recording and detecting instruments. This requirement is readily understood by the skilled workers in the art. For the purposes of the present invention, an activity of 0.1 microcurie or less of $Fe^{59}$ per milliliter of solution has been found to be desirable. This small amount of radioactivity can be used under the general licensing regulations of the Atomic Energy Commission. Since the unsaturated iron-binding capacity of normal serum is about 3 micrograms per milliliter (300% $\mu$g.), a desirable ferric iron concentration in the final solution has been found to be in the range of about 7.5–8.5 $\mu$g./ml. The source of radioactive iron, $Fe^{59}$, is diluted with iron-free water so that the concentration of ferric ion is about 16 $\mu$g./ml. and the activity is less than 0.2 $\mu$c./ml. To this solution is added an equal amount, by volume, of buffer which comprises a solution of sodium chloride, sodium barbiturate, and diethyl barbituric acid dissolved in iron-free water. Each milliliter of final solution will then contain about 8 $\mu$g. of iron and less than 0.05 $\mu$c. of activity. The pH should be about 7.0–7.5.

The resin sponge employed in this invention comprises a polyurethane foam of intercommunicating cell type containing a strong base anion-exchange resin as described in U.S. Patents 3,024,207 and 3,094,494. Such a urethane foam resin may be prepared by incorporating the ion-exchange resin particles in a mixture of a polyether or polyester and a polyisocyanate and then subjecting the mixture to the usual conditions for producing foams of the polyurethane type. An example of a suitable ion-exchange resin is a strongly basic anion-exchange resin, chloride form, such as that marketed under the trademark Amberlite IRA400. Such resins can be prepared by the process disclosed in U.S. Patent 2,591,573. The resin which is utilized should not remove iron already bound to the globulin molecule nor bind the whole molecule.

The resin sponge can be made in various forms. A convenient embodiment is a cylindrical plug which can be easily placed in the bottom of a container adapted for placement in the well of conventional scintillation counters.

The actual dimensions of the cylindrical plug of resin sponge will be determined by the volume of serum employed in the test and by the size of the container utilized to hold the serum and the radioactive solution. It is desirable that a plug of standard size and a standard volume of serum be established in utilizing the method of the present invention. Various modifications can be made in the type of resin and the content thereof in the polyurethane foam or in the makeup and characteristics of the sponge. Modifications can also be made in the volume of serum and amount of tracer material employed in the method. Such variations will not detract from the operability of the method. To obtain the greatest advantage from the practice of the method, a selected volume of serum and a selected size of a particular resin sponge should be adapted as standards.

The following examples are illustrative of the present invention and are presented to illustrate the practice of the method.

*Example I*

A solution of ferric ammonium citrate is made from $FE^{59}Cl_3$. Ferric chloride $Fe^{59}$ solution of approximately 150 microcuries activity is added to a 1000 ml. volumetric flask. 69.72 mg. of anhydrous ferric chloride is added to the flask. This represents 24 mg. of iron. Six drops of concentrated ammonium hydroxide is added to form a precipitate of ferric ammonium hydroxide $Fe^{59}$. Just enough citric acid crystals, about 2.8 gms., is added to dissolve the precipitate. The flask is agitated and approximately 500 ml. of iron-free water is added. Dilute (1:10) $NH_4OH$ is added until a pH of 7.0 is reached. The solution is then diluted with iron-free water to a total of 1000 ml. After an iron assay, the solution is further carefully diluted to provide 16 $\mu g./ml.$ of iron and an activity of approximately 0.10 $\mu c./ml.$ The addition of benzyl alcohol in a concentration of 0.9% does not interfere with the effectiveness of the test.

Buffer solution is made by dissolving 6.4 gms. of sodium chloride and 2.3 gms. of sodium barbiturate in 500 ml. of iron-free water. 6.0 gms. of diethylbarbituric acid is added, dissolved, and the solution is then diluted to 1000 ml.

The ferric ammonium citrate $Fe^{59}$ solution is mixed with the buffer solution in a one-to-one ratio so that each 1.0 ml. of final solution contains about 8 $\mu g.$ of iron and less than 0.05 $\mu c.$ of activity.

*Example II*

A container suitable for seating in the well of a scintillation counter is used to receive a polyurethane foam-anion resin sponge. The sponge is cylindrical in shape and has a diameter of 7/16 in. and a length of 11/16 in. About 10 ml. of venous blood is withdrawn from a subject and placed in a separate test tube. The blood is permitted to stand to allow the serum to separate. The serum is removed and 1 ml. is pipetted into the container. To this serum is added about 1 ml. of the ferric$^{59}$ ammonium citrate-buffer solution described in Example I. This provides a tracer amount (less than 0.1 $\mu c.$) of radioactive iron and a concentration of about 8 $\mu g.$ of iron.

The combined serum and ferric$^{59}$ ammonium citrate solution is allowed to incubate for about 10 minutes. Although the binding of the iron to the serum protein is rapid, the 10-minute incubation period assures complete binding. The resin sponge is then added to the container and the combined serum, resin sponge and ferric ammonium citrate solution are allowed to incubate for about one hour. The temperature is recorded so that correction can be made later, if necessary. The resin-sponge uptake (percent sponge uptake) of radioactivity is affected by the incubation temperature to a small degree. Near 25° C., a correction of 1% per 5° C. is sufficiently accurate if it is desired to compare percent sponge uptake values determined at different temperatures. During the one hour incubation period, the container is placed in the well of a scintillation counter so that the well surrounds the resin sponge within the container. The radioactivity counts are recorded and correction is made for background radioactivity. The container is removed and the serum-ferric$^{59}$ ammonium citrate is decanted from the container. Two or three ml. of iron-free, distilled or deionized water is added to the container and the sponge is squeezed several times to assure good washing. The washing procedure is repeated three times. The container is then returned to the well of the scintillation counter and the radioactivity remaining on the sponge is recorded with correction for background as in the previous recording. The percent iron uptake by the resin sponge is determined by the following equation:

$$\text{Percent Sponge Uptake} = \frac{\text{Residual Activity}}{\text{Initial Activity}} \times 100$$

where the initial activity is the radioactivity as determined by the counts of the combined serum, ferric$^{59}$ ammonium citrate solution and resin sponge and the residual activity is the radioactivity remaining on the sponge after the foregoing washing steps. The percent figure provides an indication of the excess iron which has not reacted with the serum. The unsaturated iron-binding capacity can easily be determined from the following relation:

$$UIBC = \mu g. \text{ Fe added} - \text{percent Sponge Uptake}$$
$$(\mu g. \text{ Fe added})$$

*Example III*

The steps of Example II were followed to determine the percent sponge uptake and unsaturated iron-binding capacity of sera withdrawn from a number of subjects. The following table presents the initial and residual activity as counts per minute, the percent sponge uptake, the initial iron concentration and the excess iron concentration, expressed as micrograms of iron, and the unsaturated iron-binding capacity of the respective sera.

SPONGE

| Subject | Initial, c.p.m. | Residual, c.p.m. | Percent Sponge Uptake | Mg. Fe-Excess | $\mu g.$ Fe Added | UIBC, $\mu g.$ Fe/ml. |
| --- | --- | --- | --- | --- | --- | --- |
| 1 | 204,705 | 130,593 | 71.44 | 6.00 | 8.40 | 2.40 |
| 2 | 197,809 | 98,632 | 49.86 | 3.87 | 7.76 | 3.89 |
| 3 | 201,906 | 147,210 | 72.91 | 6.12 | 8.40 | 1.28 |

The scintillation counters employed in the method comprise a detector unit and the required ancillary units which are well known to the skilled members of the art.

It is not desired to be limited to the exact details described, for obvious modifications will occur to a person skilled in the art. All such practice of the invention is considered to be a part hereof provided it falls within the scope of the appended claims.

What is claimed is:

1. A method for measuring the unsaturated iron-binding capacity of serum which comprises the steps of: mixing a tracer amount of radioactive iron with blood serum; placing in intimate contact with said mixture a resin sponge comprising a polyurethane foam of intercommunicating cell type containing a strong base anion-exchange resin; incubating the mixture and the resin sponge; measuring the initial radioactivity of the combined mixture and resin sponge with suitable detecting means; removing the resin sponge from the mixture; washing the resin sponge with an aqueous solution; and measuring the residual radioactivity in the resin sponge.

2. A method for measuring the unsaturated iron-binding capacity of serum which comprises the steps of: mixing a tracer amount of radioactive iron with blood serum; placing in intimate contact with said mixture a resin sponge comprising a polyurethane foam of intercommunicating cell type containing a strong base anion-exchange resin; incubating the mixture and the resin sponge; measuring the initial radioactivity of the combined mixture and the resin sponge with suitable detecting means; removing the serum; washing the resin sponge; and measuring the residual radioactivity in the sponge with suitable detecting means.

3. A method for measuring the unsaturated iron-binding capacity of blood serum which comprises the steps of: mixing ferric ammonium citrate solution containing radioactive iron with blood serum, said solution having as iron concentration of about 7.5–8.5 micrograms and an activity of about 0.05–0.1 microcurie to about 1 ml. of blood serum; placing in intimate contact with said mixture a resin sponge comprising a polyurethane foam of intercommunicating cell type containing a strong base anion-exchange resin; incubating the mixture and the resin sponge for a time sufficient to permit binding of the iron and serum; measuring the initial radioactivity of the combined mixture and the resin sponge with suitable detecting means; removing the resin sponge from the mixture; washing the resin sponge with iron-free water; and measuring the residual radioactivity in the resin sponge with suitable detecting means.

4. The method of claim 3 in which the ferric ammonium citrate solution has a pH of from about 7.0 to about 7.5.

5. A method for measuring the unsaturated iron-binding capacity of serum which comprises the steps of: mixing ferric ammonium citrate solution containing radioactive iron with blood serum; placing in intimate contact with said mixture a resin sponge comprising a polyurethane foam of intercommunicating cell type containing a strong base anion-exchange resin; incubating the mixture and the resin sponge; measuring the initial radioactivity of the combined mixture and the resin sponge with suitable detecting means; removing the serum; washing the resin sponge; and measuring the residual radioactivity in the sponge with suitable detecting means.

References Cited

UNITED STATES PATENTS 3,206,602    9/1965    Eberle _____ 250—71.5

OTHER REFERENCES

Mitchell et al.: "The in Vitro Resin Sponge Uptake of Triiodothyronine–$I^{131}$ From Serum in Thyroid Disease and in Pregnancy," Journal of Chemical Endocrinology and Metabolism, vol. 20, 1960, pp. 1474–1483.

MORRIS O. WOLK, *Primary Examiner.*

R. E. SERWIN, *Assistant Examiner.*